United States Patent
Goto et al.

(10) Patent No.: US 11,411,414 B2
(45) Date of Patent: Aug. 9, 2022

(54) POWER SUPPLY DEVICE THAT PERFORMS MALFUNCTIONED DETERMINATION

(71) Applicant: TOYOTA JIDOSHA KABUSHIKI KAISHA, Toyota (JP)

(72) Inventors: Shigeaki Goto, Nagakute (JP); Kyosuke Tanemura, Nagakute (JP); Shuji Tomura, Nagakute (JP); Naoki Yanagizawa, Nagakute (JP); Kazuo Ootsuka, Nagakute (JP); Junta Izumi, Nagoya (JP); Kenji Kimura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/655,042

(22) Filed: Oct. 16, 2019

(65) Prior Publication Data
US 2020/0136405 A1    Apr. 30, 2020

(30) Foreign Application Priority Data
Oct. 31, 2018   (JP) .............................. JP2018-204651

(51) Int. Cl.
*H02J 7/00*       (2006.01)

(52) U.S. Cl.
CPC .......... *H02J 7/0031* (2013.01); *H02J 7/0063* (2013.01); *H02J 2007/0067* (2013.01)

(58) Field of Classification Search
CPC .................................................. H02J 7/0031
USPC ........................................................ 320/121
See application file for complete search history.

(56) References Cited

U.S. PATENT DOCUMENTS

| 4,458,165 A | * | 7/1984 | Jackson | ............... | H03K 3/0315 |
| | | | | | 327/276 |
| 2004/0198468 A1 | * | 10/2004 | Patel | ...................... | H02J 7/0025 |
| | | | | | 455/574 |
| 2011/0298417 A1 | * | 12/2011 | Stewart | .............. | G01R 31/3648 |
| | | | | | 320/107 |
| 2013/0026993 A1 | * | 1/2013 | Hintz | .................... | H02J 7/0016 |
| | | | | | 320/119 |
| 2014/0306666 A1 | * | 10/2014 | Choi | ..................... | H02J 7/0016 |
| | | | | | 320/134 |

(Continued)

FOREIGN PATENT DOCUMENTS

| JP | 03054898 B2 | 8/1991 |
| JP | H05291901 A | 11/1993 |
| JP | 2017103629 A | 6/2017 |

(Continued)

*Primary Examiner* — Yalkew Fantu
(74) *Attorney, Agent, or Firm* — Dickinson Wright, PLLC

(57) ABSTRACT

There is provided a power supply device including a plurality of battery modules, the battery modules being connected in series with one another according to a gate driving signal from a controller, the power supply device transmitting the gate driving signal from upstream of the series connection toward downstream of the series connection after the gate driving signal is delayed at delay circuits included in the respective battery modules, and returning the gate driving signal to the controller from a most downstream battery module, wherein the power supply device performs malfunction determination of the delay circuits based on a time difference from a transmission time of a signal from the controller to a reception time of the signal.

4 Claims, 9 Drawing Sheets

(56) References Cited

U.S. PATENT DOCUMENTS

2017/0163268 A1* 6/2017 Maeda .................... H03K 5/14

FOREIGN PATENT DOCUMENTS

| JP | 2018-074709 A | | 5/2018 |
|----|---------------|---|--------|
| JP | 2018074709 | * | 5/2018 |
| WO | 2018/079664 A1 | | 5/2018 |

* cited by examiner

POWER SUPPLY DEVICE THAT PERFORMS MALFUNCTIONED DETERMINATION

INCORPORATION BY REFERENCE

The disclosure of Japanese Patent Application No. 2018-204651 filed on Oct. 31, 2018 including the specification, drawings and abstract is incorporated herein by reference in its entirety.

BACKGROUND

1. Technical Field

The present disclosure relates to a power supply device that has battery modules connected in series and supplies electric power.

2. Description of Related Art

Power supply devices that have a plurality of battery modules connected in series and supply a load with electric power (power a load) are used. When the batteries included in the battery modules are secondary batteries, the power supply device can also charge these batteries from the load side (regenerate electric power).

For such power supply devices, a configuration including a switching circuit that connects and isolates the battery module to and from a load based on a gate driving signal has been proposed. In this circuit configuration, voltage control is performed by driving the switching circuit of each battery module through a gate driving signal via a delay circuit (Japanese Patent Application Publication No. 2018-074709).

SUMMARY

In a conventional power supply device, there can be a concern that an output voltage from the battery modules connected in series becomes unstable when some delay circuits of the battery modules fail and a delay time varies from a supposed value, which disables control of the power supply device as supposed. Accordingly, it is desired to be able to detect malfunction of a delay circuit in the battery modules. It is desirable to be able to identify the delay circuit that fails in order to perform maintenance on that delay circuit, such as repair or replacement.

One aspect of the present disclosure is a power supply device including a plurality of battery modules each having a secondary battery, the battery modules being connected in series with one another according to a gate driving signal from a controller, the power supply device transmitting the gate driving signal from upstream of the series connection toward downstream of the series connection after the gate driving signal is delayed at delay circuits included in the respective battery modules, and returning the gate driving signal to the controller from a most downstream battery module, wherein the power supply device performs malfunction determination of a delay circuit based on a time difference from a transmission time of a signal from the controller to a reception time of the signal.

Here, it may be determined that the delay circuit fails when the time difference is outside of a supposed time difference range.

Moreover, the power supply device may include a switch for each delay circuit, the switch capable of selecting connection or diversion of the delay circuit, wherein a delay circuit that fails is identified based on relation between the time difference and a connection state between the delay circuits with the switches.

The present disclosure having this aspect can appropriately detect malfunction of a delay circuit in a power supply device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
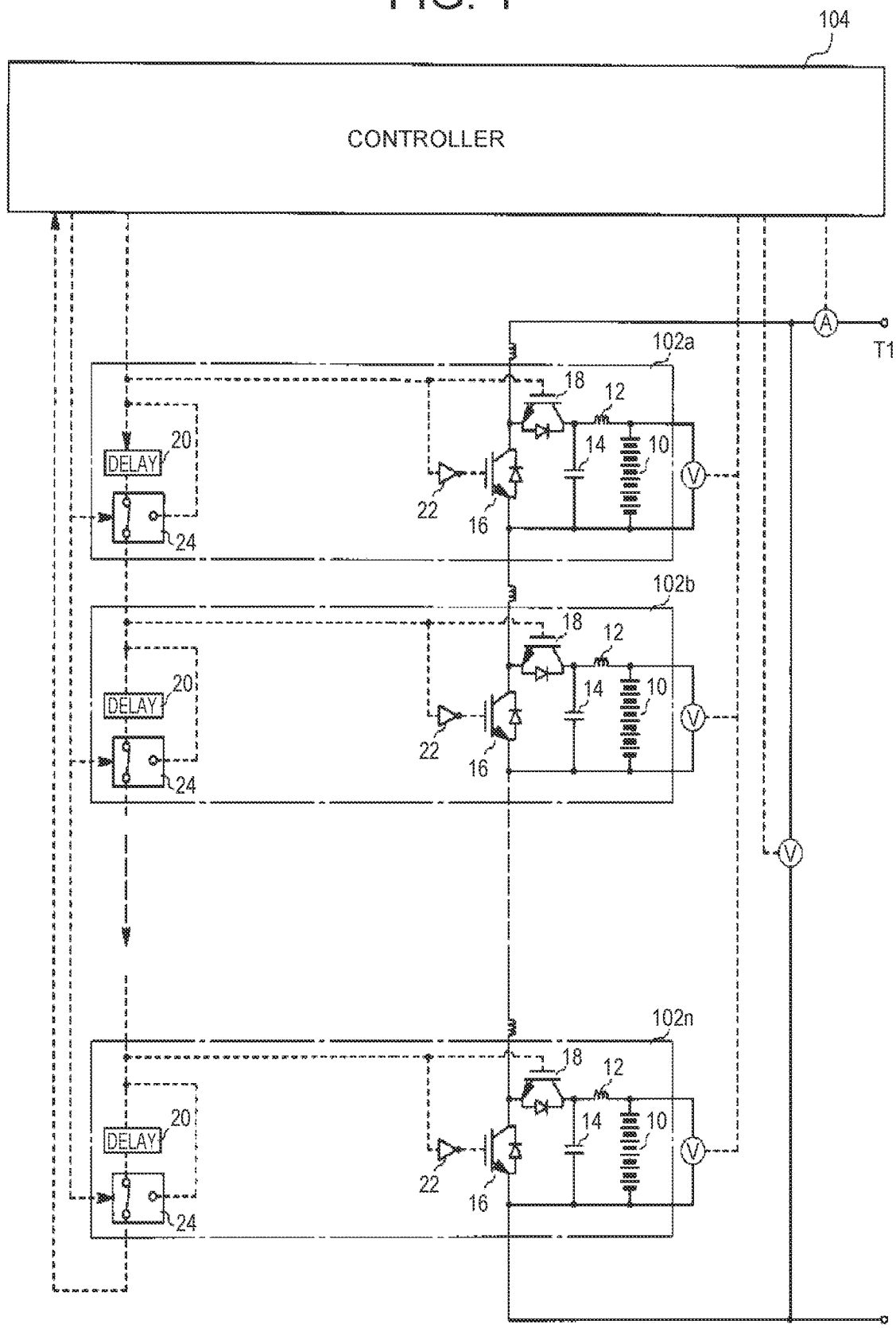
FIG. 1 is a diagram showing the configuration of a power supply device in an embodiment of the present disclosure.

As shown in FIG. 1, a power supply device 100 in an embodiment includes battery modules 102 and a controller 104. The power supply device 100 includes a plurality of battery modules 102 (102a, 102b, . . . 102n). The battery modules 102 can be connected in series with one another under control by the controller 104. The battery modules 102 included in the power supply device 100 can supply a load (not shown) connected to terminals T1, T2 with electric power (power a load), or can be charged with electric power from a power source (not shown) connected to the terminal T1, T2 (regenerate electric power).

The battery module 102 includes a battery 10, a choke coil 12, a capacitor 14, a first switch element 16, a second switch element 18, a delay circuit 20, a NOT element 22, and a diverting switch element 24. In this embodiment, the battery modules 102 have the same configuration.

The battery 10 includes at least one secondary battery. For example, the battery 10 can have a configuration in which a plurality of lithium-ion batteries, nickel-metal hydride batteries, or the like is connected in series or parallel. The choke coil 12 and the capacitor 14 form a smoothing circuit (low-pass filter circuit) that smooths an output from the battery 10 and outputs the smoothed output. That is, a secondary battery is used as the battery 10, and the battery 10 deteriorates as the internal resistance loss increases. To reduce such deterioration, the current is smoothed by an RLC filter formed by the battery 10, the choke coil 12, and the capacitor 14. However, the choke coil 12 and the capacitor 14 are not essential components and may be omitted.

The first switch element 16 includes a switching element for short-circuiting an output terminal of the battery 10. In this embodiment, the first switch element 16 has a configuration in which a freewheeling diode is connected in parallel to a field-effect transistor that is a switching element. The second switch element 18 is connected in series with the battery 10 between the battery 10 and the first switch element 16. In this embodiment, the second switch element 18 has a configuration in which a freewheeling diode is connected in parallel to a field-effect transistor that is a switching element. Switching of the first switch element 16 and the second switch element 18 is controlled through a gate driving signal from the controller 104. While field-effect transistors are used in the first switch element 16 and the second switch element 18 in this embodiment, other switching elements may also be used.

When the gate driving signal is transmitted to each battery module 102 from the controller 104, the gate driving signal is input as it is into a gate terminal of the second switch element 18, an inverted signal of the gate driving signal by the NOT element 22 is input into a gate terminal of the first switch element 16. Thus, when the gate driving signal level is high (H), the first switch element 16 is turned off and the second switch element 18 is turned on, and when the gate driving signal level is low (L), the first switch element 16 is turned on and the second switch element 18 is turned off. In other words, the gate driving signal level is high (H), the battery module 102 is put in a state of being connected in series with the other battery modules 102, and when the gate driving signal level is low (L), the battery module 102 is put in a pass-through state of being isolated from the other battery modules 102.

The delay circuit 20 is a circuit that controls the battery module 102 based on the gate driving signal input into the battery module 102 from the controller 104. The delay circuit 20 includes a delay circuit that delays the gate driving signal by a predetermined time. In the power supply device 100, the delay circuits 20 are respectively provided in the battery modules 102 (102a, 102b, . . . 102n) and connected in series with one another. Therefore, the gate driving signal input from the controller 104 is sequentially input into the battery modules 102 (102a, 102b, . . . 102n) while being delayed by a predetermined time at each battery module 102. Control based on the gate driving signal will be described later.

The gate driving signal output from the delay circuit 20 of a battery module 102n at the last stage is returned to the controller 104. In other words, the signal transmitted from the controller 104 is returned to the controller 104 at the final stage.

The diverting switch element 24 is a switch element that enables selection of connection or diversion of the delay circuit 20. Upon reception of a control signal from the controller 104, the diverting switch element 24 exclusively switches the delay circuit 20 between a state of the delay circuit 20 being connected and a state of the delay circuit 20 being diverted. In the state of the delay circuit 20 being connected, the delay circuit 20 outputs, to the downstream, the gate driving signal input from the upstream while delaying the gate driving signal by a predetermined time. In the state of the delay circuit 20 being diverted, the gate driving signal is output to the downstream without being delayed by the delay circuit 20.

Normal Control

Control of the power supply device 100 will be described below with reference to FIG. 2. In normal control, the diverting switch elements 24 are respectively set to the states where the delay circuits 20 of the battery modules 102 are not diverted.

Figure 2:
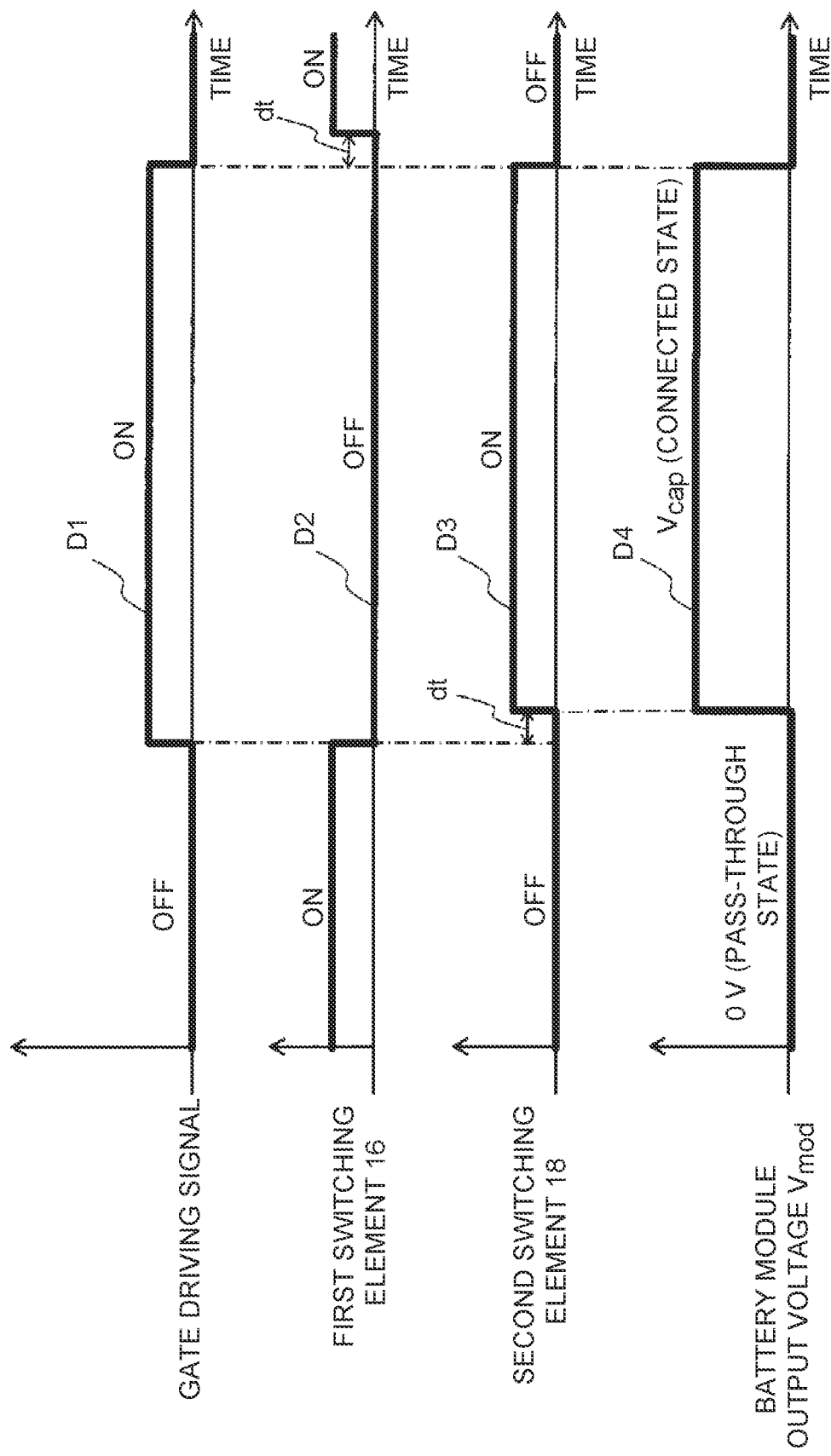
FIG. 2 is a time chart illustrating control of a battery module in the embodiment of the present disclosure.

FIG. 2 is a time chart relating to the operation of the battery module 102a. FIG. 2 shows a pulse waveform of a gate driving signal D1 that drives the battery module 102a, a rectangular wave D2 representing the switching state of the first switch element 16, a rectangular wave D3 representing the switching state of the second switch element 18, and a waveform D4 of a voltage Vmod output from the battery module 102a.

In an initial state of the battery module 102a, i.e., in a state where the gate driving signal is not being output, the first switch element 16 is on and the second switch element 18 is off. When the gate driving signal is input from the controller 104 into the battery module 102a, switching of the battery module 102a is controlled by PWM control. Under this switching control, the first switch element 16 and the second switch element 18 are switched so as to be alternately turned on and off.

As shown in FIG. 2, when the gate driving signal D1 is output from the controller 104, the first switch element 16 and the second switch element 18 of the battery module 102a are driven according to the gate driving signal D1. The first switch element 16 switches from an on state to an off state as the signal from the NOT element 22 falls in response to a rise of the gate driving signal D1. The first switch element 16 switches from an off state to an on state with a delay of a short time (dead time dt) after a fall of the gate driving signal D1.

Meanwhile, the second switch element 18 switches from an off state to an on state with a delay of a short time (dead time dt) after a rise of the gate driving signal D1. The second switch element 18 switches from an on state to an off state at the same time that the gate driving signal D1 falls. Thus, switching of the first switch element 16 and the second switch element 18 is controlled such that these switch elements are alternately turned on and off.

It is to prevent the first switch element 16 and the second switch element 18 from being activated at the same time, that the first switch element 16 is activated with a delay of a short time (dead time dt) after a fall of the gate driving signal D1, and that the second switch element 18 is activated with a delay of a short time (dead time dt) after a rise of the gate driving signal D1. Thus, short-circuit of the battery resulting from the first switch element 16 and the second switch element 18 turning on at the same time is prevented. The dead time dt that causes a delay in activation is set to 100 ns, for example, but can be set to any appropriate time. During the dead time dt, a current is circulated through the diode, which creates the same state as when a switching element parallel to this diode through which a current circulates is turned on.

Figure 3A:
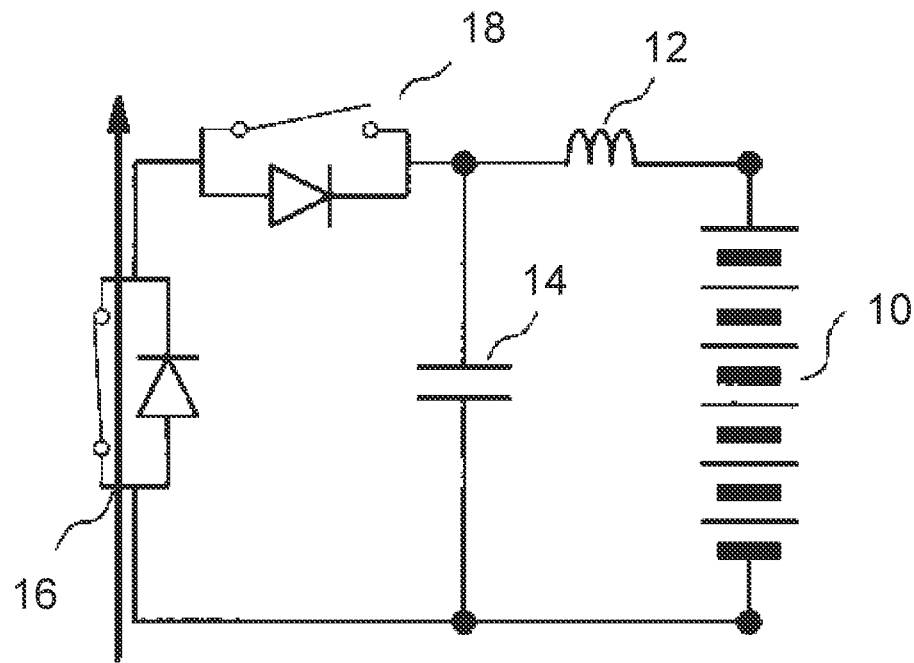
FIG. 3A is a diagram showing the operation of the battery module in the embodiment of the present disclosure.

In the battery module 102a thus controlled, the capacitor 14 is isolated from the output terminal of the battery module 102a when the gate driving signal D1 is off (i.e., the first switch element 16 is on and the second switch element 18 is off). Therefore, no voltage is output from the battery module 102a to the output terminal. In this state, the battery module 102a is in a pass-through state in which the battery 10 (capacitor 14) is bypassed as shown in FIG. 3A.

Figure 3B:
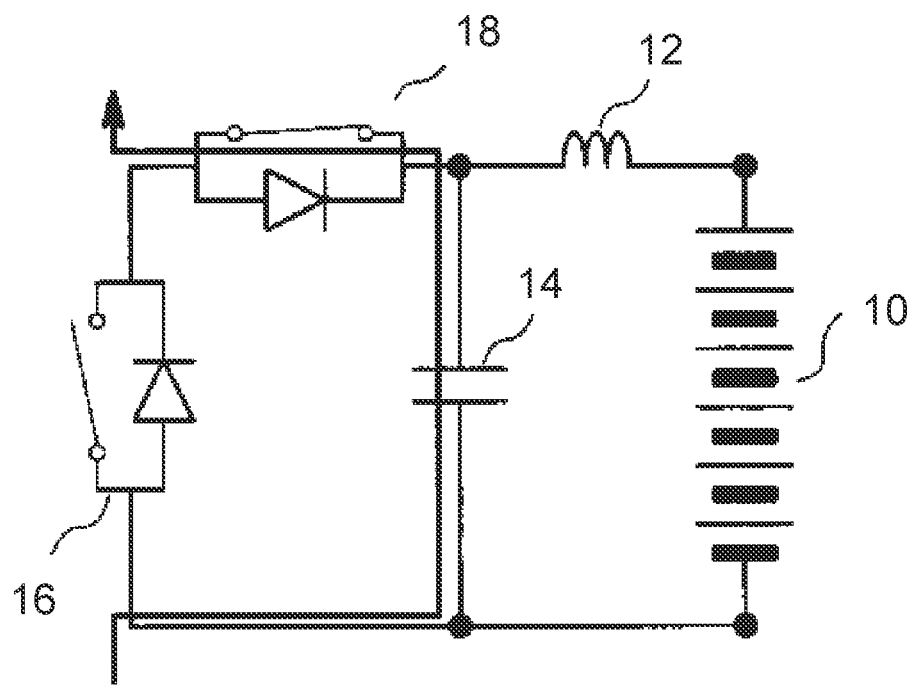
FIG. 3B is a diagram of the operation of the battery module in the embodiment of the present disclosure.

The capacitor 14 is connected to the output terminal of the battery module 102a when the gate driving signal D1 is on (i.e., the first switch element 16 is off and the second switch element 18 is on). Thus, a voltage is output from the battery module 102a to the output terminal. In this state, the voltage Vmod is output to the output terminal through the capacitor 14 of the battery module 102a as shown in FIG. 3B.

Referring back to FIG. 1, control of the power supply device 100 by the controller 104 will be described. The controller 104 controls all the battery modules 102. By controlling the battery modules 102a, 102b, . . . 102n, the controller controls the output voltage of the power supply device 100 as a whole.

A signal generating circuit 104a of the controller 104 outputs the gate driving signal as a rectangular wave to the battery modules 102. The gate driving signal is sequentially transmitted to the delay circuit 20 included in the battery module 102a, the delay circuit 20 included in the battery module 102b, and so on to the subsequent other battery modules 102. Specifically, the gate driving signal is sequentially transmitted to the battery modules 102 connected in series in the power supply device 100, from a most upstream side toward a downstream side, while being delayed by a predetermined delay time at each battery module 102.

Figure 4:
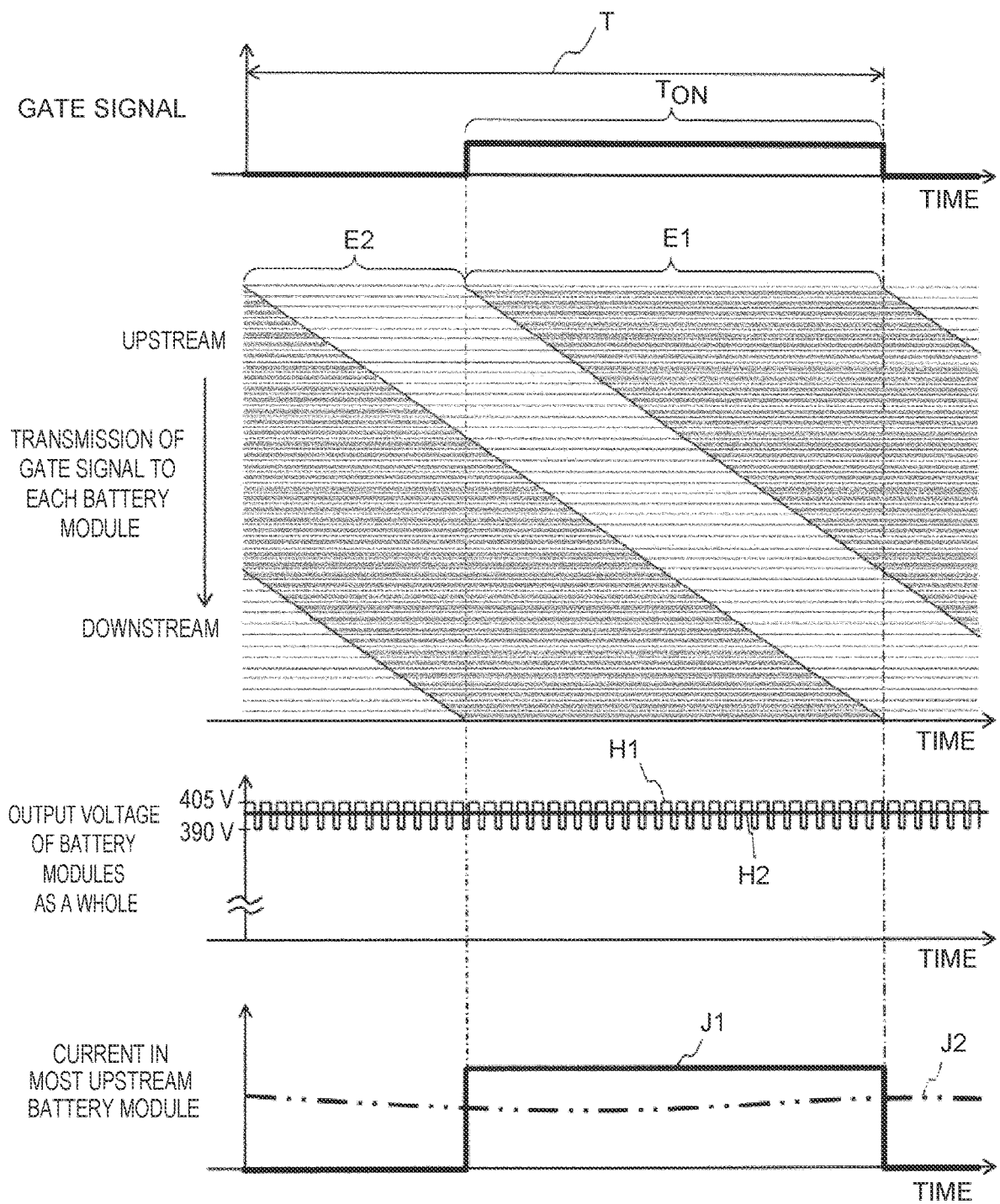
FIG. 4 is a time chart illustrating control of the power supply device in the embodiment of the present disclosure.

FIG. 4 shows a sequence of control under which electric power is output by sequentially connecting, in series, a predetermined number of battery modules among the battery modules 102a, 102b, . . . 102n. As shown in FIG. 4, the battery modules 102a, 102b, . . . 102n are driven according to the gate driving signal, one after another from an upstream side toward a downstream side, each with a delay of a certain time. In FIG. 4, a period E1 represents a state in which the first switch elements 16 are off and the second switch elements 18 are on in the battery modules 102a, 102b, . . . 102n, and the battery modules 102a, 102b, . . . 102n are outputting a voltage from the output terminals (connected state). A period E2 represents a state in which the first switch elements 16 are on and the second switch elements 18 are off in the battery modules 102a, 102b, . . . 102n, and the battery modules 102a, 102b, . . . 102n are not outputting a voltage from the output terminals (pass-through state). Thus, the battery modules 102a, 102b, . . . 102n are sequentially driven, each with a delay of a certain time.

Settings of the gate driving signal and the delay time will be described with reference to FIG. 4. A cycle T of the gate driving signal is set by adding up the delay times of the respective battery modules 102a, 102b, . . . 102n. Therefore, setting a longer delay time results in a lower frequency of the gate driving signal. Conversely, setting a shorter delay time results in a higher frequency of the gate driving signal. The delay time by which the gate driving signal is delayed can be appropriately set according to the required specifications of the power supply device 100.

An on-time ratio D (on-duty) during the cycle T of the gate driving signal, i.e., a ratio of a time TON for which the gate driving signal is at a high (H) level relative to the cycle T, is calculated by: the output voltage of the power supply device 100/the total voltage of the battery modules 102a, 102b, . . . 102n (the battery voltage of the battery module 102× the number of the battery modules). Thus, the on-time ratio D=(the output voltage of the power supply device 100)/(the battery voltage of the battery module 102× the total number of the battery modules 102). To be exact, the on-time ratio deviates by an amount corresponding to the dead time dt, and therefore, the on-time ratio may be corrected by feed-back or feed-forward, as commonly practiced for chopper circuits.

As described above, the output voltage of the power supply device 100 is represented by a value obtained by multiplying the battery voltage of the battery module 102 by the number of the battery modules 102 in the connected state. If the output voltage of the power supply device 100 has a value that can be evenly divided by the battery voltage of one battery module 102, at the moment when one battery module 102 switches from the pass-through state to the connected state, another battery module 102 switches from the connected state to the pass-through state, so that the total output voltage of the battery module 102 does not vary.

However, if the output voltage of the power supply device 100 has a value that cannot be evenly divided by the battery voltage of the battery module 102, the output voltage of the power supply device 100 (total output voltage) varies. In this case, the amplitude of the variation corresponds to the voltage of one battery module, and the period of the variation corresponds to: the cycle T of the gate driving signal/the total number of the battery modules 102. Increasing the total number of the battery modules 102 can make the value of parasitic inductance in the entire power supply device 100 larger, so that this voltage variation is filtered out and the output voltage of the power supply device 100 can be stabilized.

Next, a specific example will be described. In FIG. 4, it is assumed, for example, that the desired output voltage of the power supply device 100 as a whole is 400 V; the battery voltage of each battery module 102 is 15 V; the number of the battery modules 102a, 102b, . . . 102n is 40; and the delay time is 200 ns. This case corresponds to a case where the output voltage (400 V) of the power supply device 100 cannot be evenly divided by the battery voltage (15 V) of the battery module 102.

Based on these numerical values, the cycle T of the gate driving signal is calculated by the delay time× the total number of battery modules as follows: 200 ns×40=8 μs. Therefore, the gate driving signal is a rectangular wave with a frequency equivalent to 125 kHz. The on-time ratio D of the gate driving signal is calculated by the output voltage of the power supply device 100/(the battery voltage of the battery module 102×the total number of battery modules 102) as follows: 400 V/(15 V×40)≈0.67.

When the battery modules 102a, 102b, . . . 102n are sequentially driven based on these numerical values, an output voltage H1 with a rectangular waveform in FIG. 4 is produced by the power supply device 100 as a whole. This output voltage H1 varies between 390 V and 405 V. Specifically, the output voltage H1 varies in cycles calculated by: the cycle T of the gate driving signal/the total number of battery modules, i.e., 8 μs/40=200 ns (equivalent to 5 MHz). This variation is filtered out by the parasitic inductance the wiring of the battery modules 102a, 102b, . . . 102n, so that the power supply device 100 as a whole produces an output voltage H2 of about 400 V.

A current flows through the capacitor 14 of each battery module 102 when the battery module 102 is in the connected state, and a capacitor current waveform J1 is a rectangular waveform as shown in FIG. 4. Since the battery 10 and the capacitor 14 form an RLC filter, a current J2 that has been filtered and smoothed flows through the power supply device 100. Thus, the current waveform is uniform in all the battery modules 102a, 102b, . . . 102n, and a current can be output evenly from all the battery modules 102a, 102b, . . . 102n.

As has been described above, to control the power supply device 100, the gate driving signal output to the most upstream battery module 102a is output to the downstream battery module 102b with a delay of a certain time, and this gate driving signal is further sequentially transmitted to the downstream battery modules 102, each time with a delay of a certain time, so that the battery modules 102a, 102b, . . .

102*n* sequentially output a voltage, each with a delay of a certain time. These voltages are added up to a voltage that is output from the power supply device 100 as a whole. Thus, a desired voltage can be output from the power supply device 100.

The power supply device 100 can eliminate the need for a boosting circuit and thereby simplify the configuration of the power supply circuit. Moreover, the power supply device 100 can achieve downsizing and cost reduction. By eliminating the need for a balancing circuit, etc. that incurs electric power loss, the power supply device 100 can achieve higher efficiency. Since the voltage is output substantially evenly from the battery modules 102*a*, 102*b*, . . . 102*n*, it is unlikely that a specific battery module 102 is intensively driven, so that the internal resistance loss in the power supply device 100 can be reduced.

It is possible to easily meet a desired voltage by adjusting the on-time ratio D, which improves the versatility of the power supply device 100. In particular, even when some of the battery modules 102*a*, 102*b*, . . . 102*n* have failed and become difficult to use, one can obtain a desired voltage by re-setting the cycle T of the gate driving signal, the on-time ratio D, and the delay time while excluding the failed battery modules 102 and using normal battery modules 102. This means that a desired voltage can be continuously output even when some of the battery modules 102*a*, 102*b*, . . . 102*n* have failed.

When the delay time by which the gate driving signal is delayed is set longer, the frequency of the gate driving signal becomes lower, and so does the switching frequency of the first switch element 16 and the second switch element 18, which results in a smaller switching loss and higher power conversion efficiency. Conversely, when the delay time by which the gate driving signal is delayed is set shorter, the frequency of the gate driving signal becomes higher, and so does the frequency of the voltage variation, which makes the variation easy to filter out to obtain a stable voltage. It also becomes easy to smooth out a current variation by the RLC filter. Thus, it is possible to provide a power supply device 100 according to the required specifications and performance by adjusting the delay time by which the gate driving signal is delayed.

Delay Circuit Malfunction Detection Processing

Detection processing of malfunction of a delay circuit 20 in the power supply device 100 will be described below. The power supply device 100 in this embodiment performs determination of malfunction of the delay circuit 20 based on a time difference from a transmission time of a signal from the controller 104 to a reception time of the signal.

Figure 5:
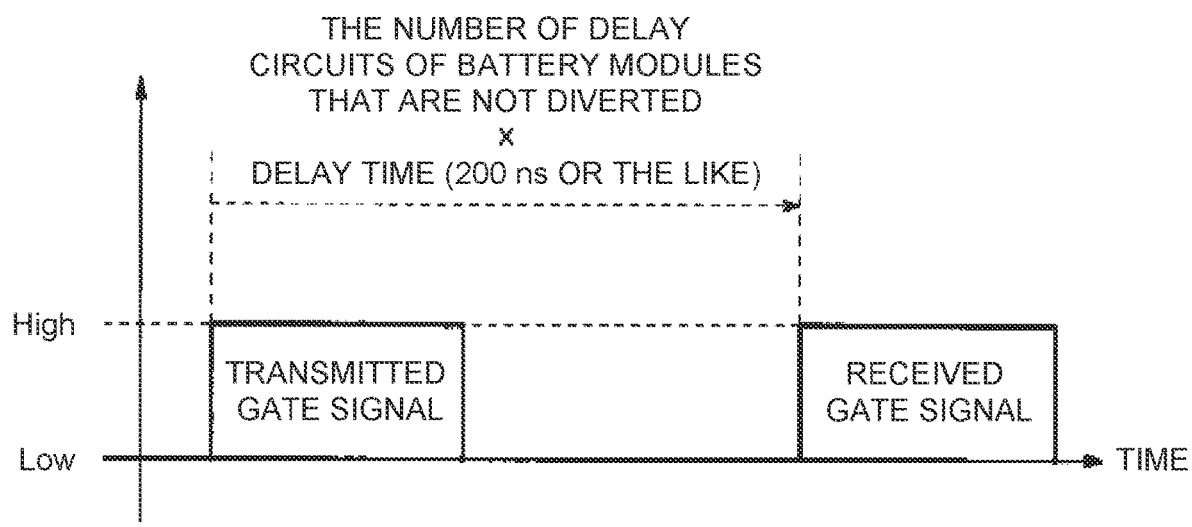
FIG. 5 is a diagram for explaining a delay time of a signal.

The signal transmitted by the controller 104 propagates with a delay of the delay time set to each delay circuit 20 at each transmission through the delay circuit 20. The delay time of the delay circuit 20 can be preset (beforehand selected). Therefore, as shown in FIG. 5, the controller 104 receives the signal transmitted by the controller 104 itself after a delay of the set value equivalent to the delay time× the number of the delay circuits 20 of the battery modules 102 that are not diverted.

When a delay circuit 20 fails and the delay time deviates from the set value, the time difference between the transmitted signal and the received signal deviates from the supposed value. Therefore, by measuring the time difference between the transmitted signal and the received signal, malfunction of the delay circuit 20 can be detected.

Delay Circuit Malfunction Site Detection Processing

Switching by the diverting switch elements 24 can individually divert the delay circuits 20 included in the battery modules 102. By monitoring the total value of the delay times in the power supply device 100 in a state where some delay circuits 20 are diverted, a malfunction site among the delay circuits 20 can be isolated.

Specifically, the controller 104 transmits, to the diverting switch element 24 included in one battery module 102, a control signal for putting the delay circuit 20 thereof in the connected state, and transmits, to the diverting switch elements 24 included in the other battery modules 102, control signals for putting the delay circuits 20 thereof in the diverted state. In this state, the delay time with the delay circuit 20 that is in the connected state is measured. Thereby, when the relevant delay time is within a predetermined time difference range with a supposed value being as a reference, the relevant delay circuit 20 can be determined to be normal, and when the delay time is outside of the time difference range, the delay circuit 20 can be determined to fail.

Figure 6:
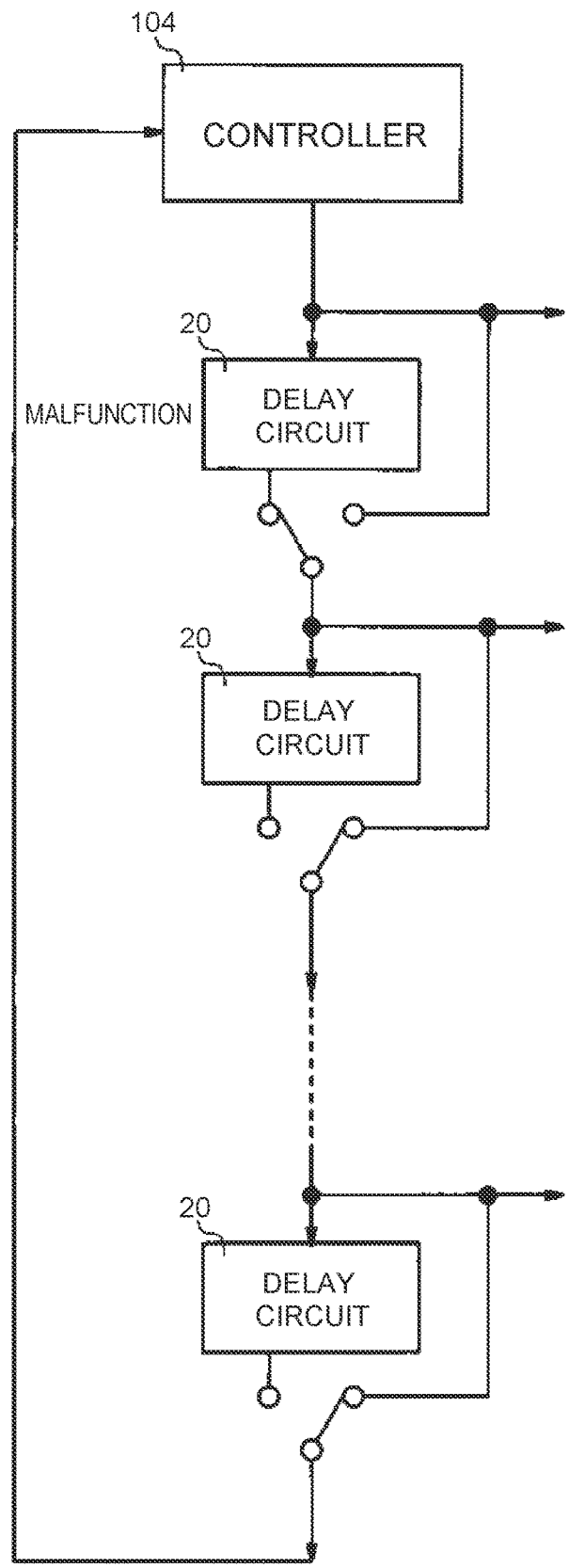
FIG. 6 is a diagram illustrating a method of identifying a malfunction site among delay circuits in the embodiment of the present disclosure.

FIG. 6 shows an example in the case where only the first delay circuit 20 is put in the connected state and the other delay circuits 20 are put in the diverted state, supposed that the first delay circuit 20 fails. Since measurement of the delay time of the signal in this state shows that the delay time with the first delay circuit 20 that fails deviates from the supposed delay time, malfunction can be detected.

Figure 7:
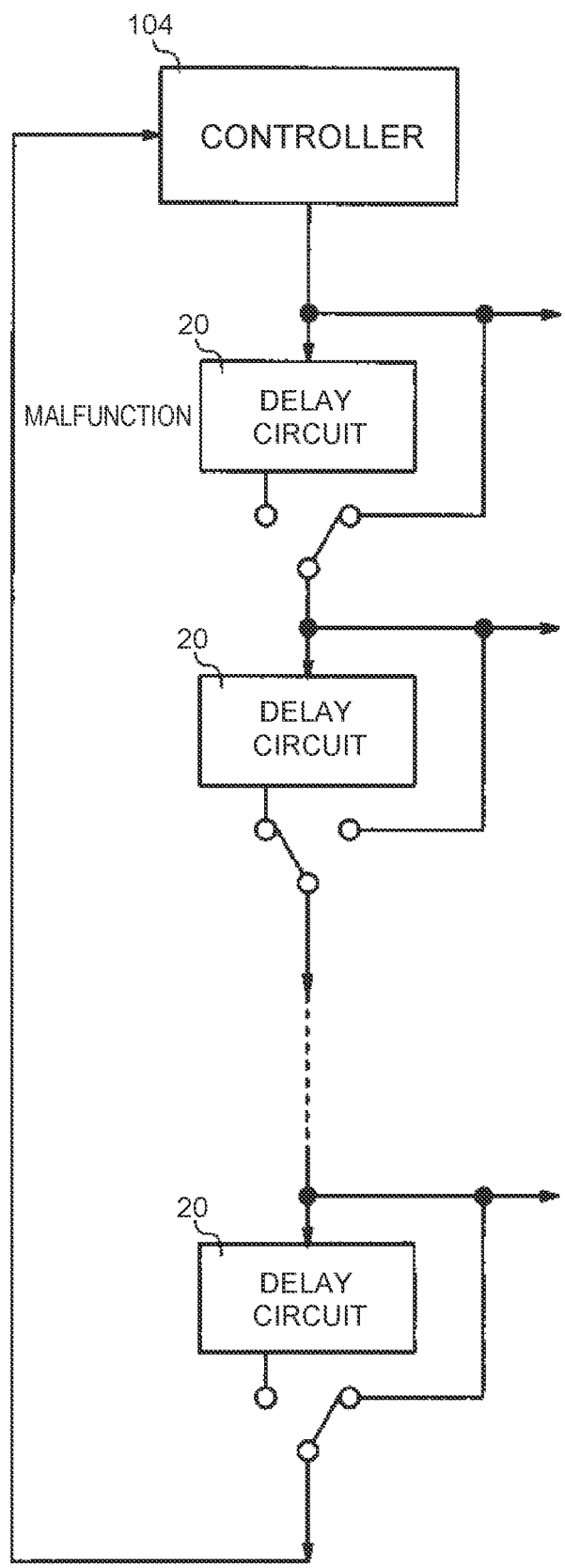
FIG. 7 is a diagram illustrating the method of identifying the malfunction site among the delay circuits in the embodiment of the present disclosure.

On the other hand, FIG. 7 shows an example in the case where only the second delay circuit 20 that does not fail is put in the connected state and the other delay circuits 20 including the first delay circuit 20 that fails are put in the diverted state. Since measurement of the delay time of the signal in this state shows that the delay time coincides with the supposed delay time, the delay circuit 20 that is put in the connected state can be determined to be normal.

Thus, by measuring the delay times while sequentially putting one delay circuit 20 in the connected state and putting the other delay circuits 20 in the diverted state, each delay circuit 20 can be detected to be normal or abnormal to identify the malfunction site.

Otherwise, the malfunction site among the delay circuits 20 can also be identified from a difference between the total value of the delay times obtained when all the delay circuits 20 are put in the connected state and the total value of the delay times obtained when one specific delay circuit 20 is put in the diverted state.

Figure 8:
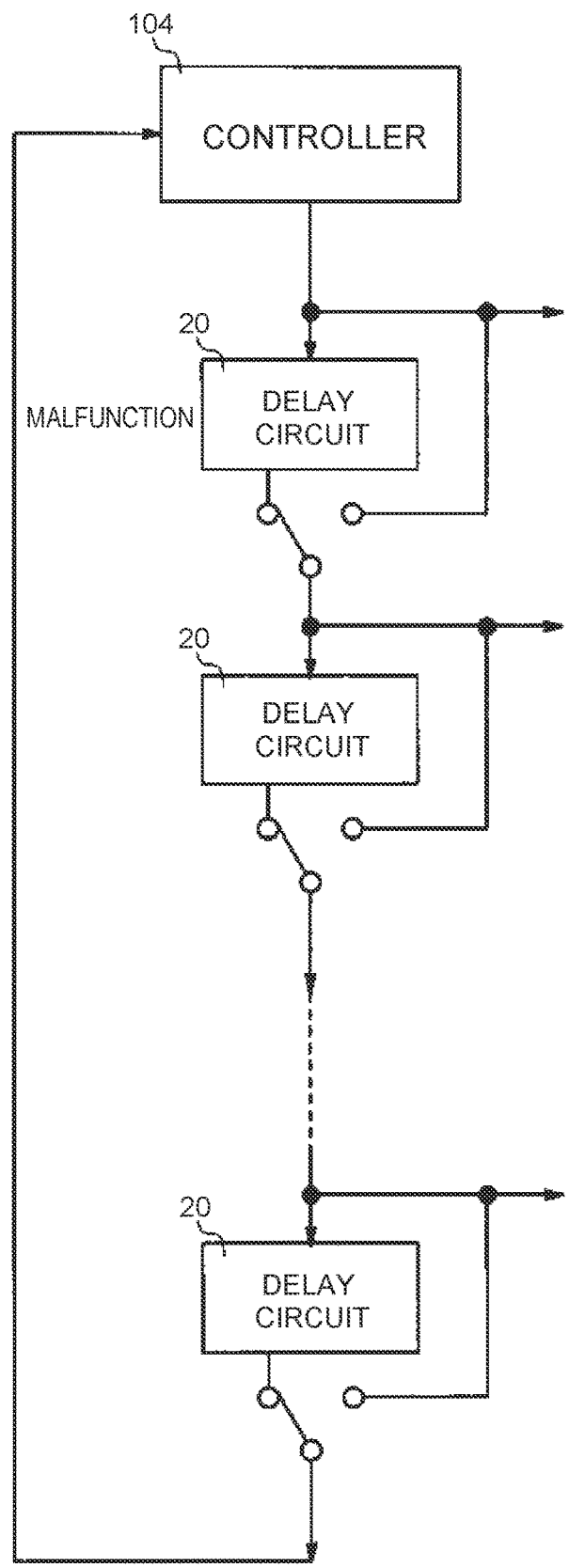
FIG. 8 is a diagram illustrating a method of identifying a malfunction site among delay circuits in the embodiment of the present disclosure.
Figure 9:
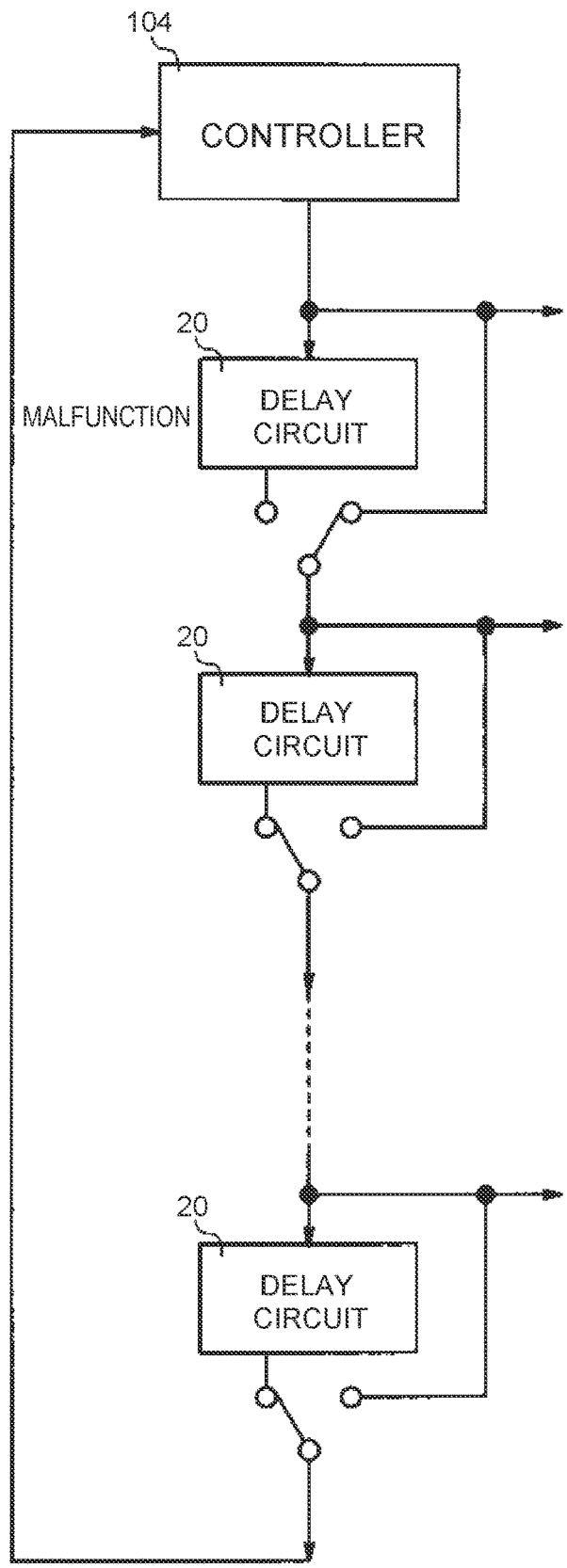
FIG. 9 is a diagram illustrating the method of identifying the malfunction site among the delay circuits in the embodiment of the present disclosure.

FIG. 8 shows a state where all the delay circuits 20 are put in the connected state, supposed that the first delay circuit 20 fails. In this state, the total value of the delay times is measured. FIG. 9 shows a state where only the first delay circuit 20 that fails is put in the diverted state and the other delay circuits 20 are put in the connected state. In this state, the total value of the delay times is measured. Since the difference between the two total values of the delay times is not within the predetermined time difference range with the delay time that is supposed for the first delay circuit 20 being as a reference, the first delay circuit 20 can be detected to fail.

Since the difference between the two total values of the delay times coincides with the delay time that is supposed for a normal delay circuit 20 when only the normal delay circuit 20 is put in the diverted state, the delay circuit 20 can be determined to be normal.

As above, the power supply device 100 in this embodiment can detect malfunction of a delay circuit 20. Therefore, maintenance such as replacement thereof can be quickly performed. By detecting a malfunction site among the delay circuits 20, only the battery module 102 that has been detected to fail can be replaced or can undergo similar maintenance, which results in improvement of the efficiency of such maintenance.

What is claimed is:

1. A power supply device comprising
a plurality of battery modules each having a secondary battery, the battery modules being connected in series with one another according to a gate driving signal from a controller, the power supply device transmitting the gate driving signal from upstream of the series connection toward downstream of the series connection after the gate driving signal is delayed at delay circuits included in the respective battery modules, and returning the gate driving signal to the controller from a most downstream battery module, and
a switch for each delay circuit, the switch capable of selecting connection or diversion of the delay circuit,
wherein a delay circuit that fails is identified based on relation between the time difference and a connection state between the delay circuits with the switches;
wherein the power supply device performs malfunction determination of a delay circuit based on a time difference from a transmission time of a signal from the controller to a reception time of the signal;
wherein it is determined that the delay circuit fails when the time difference is outside of a supposed time difference range.

2. The power supply device according to claim 1, wherein the power supply device identifies a fail of one of the delay circuits by setting one of the delay circuits to the connected state.

3. The power supply device according to claim 1, wherein the power supply device identifies a fail of a diverted delay circuit based on the difference between a total value of delay times when all the delay circuits are connected and a total value of delay times when one of the delay circuits is diverted.

4. The power supply device according to claim 1, wherein the power supply device sequentially puts one delay circuit in a connected state and other delay circuits in a diverted stated, measuring a delay time, and detecting if each delay circuit is normal or abnormal based on the measured delay time.

* * * * *